(12) United States Patent
Lambach et al.

(10) Patent No.: US 11,225,790 B1
(45) Date of Patent: Jan. 18, 2022

(54) FOAM WALL STRUCTURES AND METHODS FOR THEIR MANUFACTURE

(71) Applicant: Covestro LLC, Pittsburgh, PA (US)

(72) Inventors: James L. Lambach, McMurray, PA (US); Michael F. Palmosina, II, Baden, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 17/036,323

(22) Filed: Sep. 29, 2020

(51) Int. Cl.
*E04B 2/70* (2006.01)
*E04B 1/80* (2006.01)
*E04B 1/76* (2006.01)

(52) U.S. Cl.
CPC .............. *E04B 2/707* (2013.01); *E04B 1/762* (2013.01); *E04B 1/7654* (2013.01); *E04B 1/80* (2013.01)

(58) Field of Classification Search
CPC . E04B 2/707; E04B 1/762; E04B 1/80; E04B 1/7654
See application file for complete search history.

(56) References Cited

U.S. PATENT DOCUMENTS

| | | |
|---|---|---|
| 2,009,619 A | 7/1935 | Huffine |
| 2,030,157 A | 2/1936 | Cumpston |
| 2,055,032 A | 9/1936 | Degian |
| 2,271,929 A | 2/1942 | Venzie |
| 2,745,779 A | 5/1956 | Ritter |
| 2,780,090 A | 2/1957 | Rasmussen |
| 3,619,437 A | 11/1971 | McDonald, Jr. |
| 4,147,004 A * | 4/1979 | Day ........................ E04C 2/243 52/309.9 |
| 4,236,361 A | 12/1980 | Boden |
| 4,292,775 A | 10/1981 | Howard |
| 4,443,988 A | 4/1984 | Coutu, Sr. |
| 4,471,591 A | 9/1984 | Jamison |
| 4,671,038 A | 6/1987 | Porter |
| 4,765,105 A | 8/1988 | Tissington et al. |
| 4,786,547 A | 11/1988 | St-Michel |
| 4,856,244 A | 8/1989 | Clapp |
| 4,885,886 A | 12/1989 | Rosso |
| 5,353,560 A | 10/1994 | Heydon |
| 5,389,167 A | 2/1995 | Sperber |
| 5,417,023 A | 5/1995 | Mandish |
| 5,950,386 A | 9/1999 | Shipman et al. |
| 5,950,389 A | 9/1999 | Porter |
| 5,953,883 A | 9/1999 | Ojala |

(Continued)

FOREIGN PATENT DOCUMENTS

| | | |
|---|---|---|
| DE | 202014004695 U1 | 7/2014 |
| IE | 20050080 A1 | 8/2006 |

(Continued)

OTHER PUBLICATIONS

Oertel, Guenther, Polyurethane Handbook (2nd Edition), 1994, p. 276.

*Primary Examiner* — Rodney Mintz
(74) *Attorney, Agent, or Firm* — Donald R. Palladino (57) ABSTRACT

Foam wall structures and methods for making them are described. The wall structures include a frame, a sheet metal sheathing overlying a front surface of the frame, a foam panel overlying the sheet metal sheathing, and a foam layer disposed in a cavity defined by the frame and the sheet metal sheathing. Buildings that include such wall structures are also described.

20 Claims, 7 Drawing Sheets

(56) References Cited

U.S. PATENT DOCUMENTS

| | | |
|---|---|---|
| 5,979,131 A | 11/1999 | Remmele et al. |
| 6,085,479 A | 7/2000 | Carver |
| 6,205,729 B1 | 3/2001 | Porter |
| 6,308,491 B1 | 10/2001 | Porter |
| 6,314,695 B1 | 11/2001 | Belleau |
| 6,332,304 B1 | 12/2001 | Fuhrman |
| 6,408,594 B1 | 6/2002 | Porter |
| 6,438,915 B1 | 8/2002 | Beauboeuf |
| 6,481,172 B1 | 11/2002 | Porter |
| 6,584,749 B2 * | 7/2003 | Sperber ............... E04B 1/7604 52/404.1 |
| 6,715,249 B2 | 4/2004 | Rusek |
| 7,036,284 B1 | 5/2006 | Larson |
| 8,635,778 B1 | 1/2014 | Hagaman |
| 8,925,270 B2 * | 1/2015 | Grisolia ............... E04C 2/386 52/309.7 |
| 8,959,862 B1 | 2/2015 | Kreizinger |
| 9,145,688 B2 | 9/2015 | Hunt-Hansen |
| 9,151,053 B2 * | 10/2015 | Stephens, Jr ......... E04C 2/521 |
| 9,562,359 B1 | 2/2017 | Grisolia et al. |
| 9,920,527 B1 * | 3/2018 | Biesiadecki ........... B32B 15/18 |
| 9,938,711 B2 | 4/2018 | Grisolia et al. |
| 10,006,198 B2 | 6/2018 | Parsons et al. |
| 10,167,630 B2 * | 1/2019 | Giles ................. E04B 2/562 |
| 10,294,668 B2 | 5/2019 | Kreizinger |
| 10,301,823 B2 | 5/2019 | Kreizinger |
| 10,323,413 B1 * | 6/2019 | Biesiadecki ........... E04C 2/46 |
| 10,370,849 B2 | 8/2019 | Lambach et al. |
| 10,415,244 B2 | 9/2019 | Giles et al. |
| 10,584,475 B1 * | 3/2020 | Idd ...................... E04B 1/165 |
| 2002/0012785 A1 | 1/2002 | Leduc |
| 2002/0108320 A1 | 8/2002 | Weiss |
| 2002/0112442 A1 * | 8/2002 | Sperber ............... E04F 21/085 52/742.1 |
| 2002/0129577 A1 | 9/2002 | Weiss |
| 2003/0041544 A1 | 3/2003 | Devalapura |
| 2004/0016194 A1 | 1/2004 | Stefanutti et al. |
| 2004/0200171 A1 | 10/2004 | Schilger |
| 2005/0055973 A1 | 3/2005 | Hagen, III et al. |
| 2005/0106360 A1 | 5/2005 | Castiglione |
| 2005/0188649 A1 | 9/2005 | Hagen, Jr. |
| 2005/0247021 A1 | 11/2005 | Schauffele |
| 2006/0026925 A1 | 2/2006 | Layfield |
| 2007/0094963 A1 | 5/2007 | McDonald et al. |
| 2009/0098357 A1 | 4/2009 | Bergtold |
| 2009/0320397 A1 | 12/2009 | Hansbro et al. |
| 2010/0011701 A1 | 1/2010 | Cole et al. |
| 2010/0043327 A1 | 2/2010 | Rothwell |
| 2010/0095613 A1 | 4/2010 | Paetkau |
| 2011/0138724 A1 | 6/2011 | Olang |
| 2011/0173911 A1 | 7/2011 | Propst |
| 2011/0214374 A1 | 9/2011 | Propst |
| 2012/0011792 A1 | 1/2012 | Dewildt et al. |
| 2012/0028563 A1 | 2/2012 | Sacks |
| 2012/0096785 A1 | 4/2012 | Weeks |
| 2012/0159765 A1 | 6/2012 | Propst |
| 2012/0240501 A1 | 9/2012 | Spiegel |
| 2012/0247040 A1 | 10/2012 | Buoni et al. |
| 2013/0104469 A1 | 5/2013 | Fay |
| 2013/0104480 A1 | 5/2013 | Smith |
| 2013/0305643 A1 | 11/2013 | Singleton et al. |
| 2013/0312350 A1 | 11/2013 | Kreizinger |
| 2014/0033627 A1 * | 2/2014 | Stephens, Jr ......... E04C 2/28 52/204.5 |
| 2014/0053486 A1 | 2/2014 | Grisolia et al. |
| 2014/0115991 A1 | 5/2014 | Davenport et al. |
| 2014/0250827 A1 | 9/2014 | Gillman |
| 2014/0265027 A1 | 9/2014 | Kreizinger |
| 2015/0093535 A1 * | 4/2015 | Lambach ............. E04C 2/205 428/71 |
| 2015/0111001 A1 | 4/2015 | Sagnard et al. |
| 2015/0140243 A1 | 5/2015 | Sagnard et al. |
| 2016/0326740 A1 * | 11/2016 | Parsons ................. E04B 2/70 |
| 2017/0030074 A1 | 2/2017 | Ndobo-Epoy et al. |
| 2018/0112394 A1 * | 4/2018 | Giles ................... E04B 1/7629 |
| 2018/0363298 A1 * | 12/2018 | Giles ................... B32B 15/085 |
| 2019/0352903 A1 * | 11/2019 | Giles ................... B32B 27/12 |
| 2020/0109561 A1 * | 4/2020 | Baily ................... E04B 1/74 |
| 2021/0238850 A1 * | 8/2021 | Baily ................... E04B 2/707 |
| 2021/0252543 A1 * | 8/2021 | Lambach ............. B29C 44/18 |
| 2021/0254332 A1 * | 8/2021 | Lambach ............. B32B 3/16 |

FOREIGN PATENT DOCUMENTS

| | | |
|---|---|---|
| JP | 5546961 A | 4/1980 |
| JP | 56000437 A | 1/1981 |
| JP | 60108609 U | 7/1985 |
| JP | 3115643 | 5/1991 |
| JP | 11200521 A | 7/1999 |
| JP | 2008132676 A | 6/2008 |
| JP | 3159655 U | 5/2010 |
| JP | 2013091246 A | 5/2013 |
| WO | 9914442 A1 | 3/1999 |
| WO | 9929978 A1 | 6/1999 |

\* cited by examiner

FOAM WALL STRUCTURES AND METHODS FOR THEIR MANUFACTURE

FIELD

The inventions described in this specification relate to foam wall structures that can be particularly desirable for use in buildings constructed in regions prone to high winds and/or seismic activity.

BACKGROUND

Racking strength is an important property in wall panels, as it reflects the ability of a wall to resist movement and keep structures upright during high wind and/or seismic events. A very common approach to achieving the required design value for racking strength in residential construction is to use 2×4 or 2×6 wood framing sheathed with a wood structural panel, typically oriented strand board ("OSB"). The wood structural panel provides the racking strength to the wall panel because it is located in the plane of the shear force. Fasteners (typically nails) hold the sheathing to the framing and provide the racking strength due to their bending and pullout as the wall is placed under increasing shear. Depositing spray foam insulation into to a stud cavity in a wall panel sheathed with OSB will increase the racking strength of the wall panel.

Relatively recently, insulated wall structures satisfying strict industry insulation requirements have been developed that can be made without excessive material and labor costs. According to one proposal, a foam wall structure includes a foam panel, such as a faced polyisocyanurate panel, attached to at least a portion of a front frame surface, such that the faced polyisocyanurate panel and frame members define one or more voids within the frame; and a foam layer received within at least a portion of one of the voids within the frame, wherein the foam layer adheres to at least a portion of the faced polyisocyanurate panel.

Such foam wall structures can provide many benefits. They can exhibit high racking shear strength and excellent thermal resistance. Moreover, they can be fabricated in a controlled, possibly highly automated, manufacturing facility that is away from the construction site, thus increasing the likelihood of consistent results/performance, all while reducing labor and material costs.

Particularly in regions prone to high winds and/or seismic activity, however, it is desirable that wall structures be particularly resistant to racking shear forces. Nevertheless, for ease of construction, the overall thickness of the wall structure should be maintained without sacrificing the amount of insulation used, thereby maintaining a wall's thermal resistance properties. The inventions described in this specification were made in view of the foregoing.

SUMMARY

In certain respects, the specification relates to wall structures. These wall structures comprise: (a) a frame comprising: (i) a first member; (ii) a second member spaced apart from the first member; and (iii) connecting members extending between the first member and the second member, wherein the first member, the second member, and the connecting members each comprise a front surface and a rear surface that form a front frame surface and a rear frame surface; (b) a sheet metal sheathing having a thickness of 0.18 to 3.74 mm (0.007 to 0.147 inch) overlying the front frame surface such that the sheet metal sheathing, the first member, the second member, and the connecting members define a cavity; (c) a foam panel overlying the sheet metal sheathing; and (d) a foam layer disposed within the cavity, wherein the foam layer adheres to the sheet metal sheathing.

In other respects, this specification relates to wall structures that comprise: (a) a frame comprising: (i) a first member; (ii) a second member spaced apart from the first member; and (iii) connecting members extending between the first member and the second member, wherein the first member, the second member, and the connecting members each comprise a front surface and a rear surface that form a front frame surface and a rear frame surface; (b) a sheet metal sheathing having a thickness of 0.18 to 3.74 mm (0.007 to 0.147 inch) overlying the front frame surface such that the sheet metal sheathing, the first member, the second member, and the connecting members define a cavity; (c) a foam panel overlying the sheet metal sheathing, the foam panel comprising a facer on at least a rear face of a core foam layer, wherein the facer is different from the steel sheet metal sheathing; and (d) a foam layer disposed within the cavity, wherein the foam layer adheres to the sheet metal sheathing.

In still other respects, this specification is directed to methods for manufacturing a wall structure. These methods comprise depositing a foam-forming material into a cavity of the wall structure so that the foam-forming material forms a foam layer that adheres to a rear surface of a sheet metal sheathing that has a thickness of 0.18 to 3.74 mm 0.007 to 0.147 inch), wherein the sheet metal sheathing overlies a front surface of a frame of the wall structure, the frame being formed by a front surface of a first member, a front surface of a second member that is spaced apart from the first member, and a front surface of connecting members extending between the first member and the second member and the sheet metal sheathing is fastened to the front frame surface such that the sheet metal sheathing, the first member, the second member, and the connecting members define a cavity; and wherein a foam panel overlies the sheet metal sheathing.

The present specification also relates, among other things, buildings comprising such wall structures.

BRIEF DESCRIPTION OF THE DRAWINGS

Various features and characteristics of the inventions described in this specification may be better understood by reference to the accompanying figures, in which.

The reader will appreciate the foregoing features and characteristics, as well as others, upon considering the following detailed description of the inventions according to this specification.

DETAILED DESCRIPTION

As used in this specification, the term "front" refers to the side, face, or surface of a structure or component oriented towards the outside direction of an exterior wall of a building, and the term "rear" refers to the side, face, or surface of a structure or component oriented towards the inside direction of an exterior wall of a building.

The present specification is directed to wall structures, methods for their manufacture, and use of such structures as a wall in a building. Referring to the Figures, a wall structure 10 comprises frame 11. The frame 11 comprises a first member 12, a second member 14 spaced apart from the first member 12, and connecting members (such as the two side members and primary support member) 16, 17 extending between the first member 12 and the second member 14. As used herein, the term "connecting member" refers to a member that connects first member 12 with second member 14 and includes side members 16 and primary support members 17. The first member 12, the second member 14, and the connecting members 16, 17 each comprise a front surface and a rear surface that collectively form a front frame surface 11a and a rear frame surface 11b. The constituent members (12, 14, 16, and 17) of the frame 11 can be made out of a suitable material of construction such as wood. For example, the constituent members (12, 14, 16 and 17) of the frame 11 can comprise wooden 2×4 members (i.e., structural members made of wood having nominal thicknesses of about 2-inches, nominal widths of about 4-inches, and suitable lengths) secured together with fasteners such as nails, nail plates, screws, staples, bolts, or rivets, or a combination of any thereof.

A sheet metal sheathing 90 overlies the front frame surface 11a. As used in this specification, the term "overlie" means that the structure or component being discussed is oriented in front of the structure or component it is being compared to, i.e., the structure or component being discussed is oriented nearer to the outside direction of an exterior wall of a building than the structure or component it is being compared to.

In addition to overlying the front frame surface 11a, the sheet metal sheathing 90 may also abut the front frame surface 11a. As used herein, "abut", when used with reference to the sheet metal sheathing 90 abutting the front frame surface 11a, means that the sheet metal sheathing 90 touches the front frame surface 11a so that the sheet metal sheathing 90 is not spaced apart from the front frame surface 11a.

As used in this specification, the term "sheet metal" refers to metal formed into flat, impermeable pieces having a thickness of 0.1 mm to 8 mm (0.004 to 0.315 inch). In some implementations, the sheet metal sheathing 90 comprises a ferrous metal, such as carbon steel, galvanized steel, galvannealed steel, and stainless steel, though other metals, such as aluminum, brass, copper, tin, nickel, and titanium, can be readily envisaged. In some implementations, sheet metal sheathing 90 has a thickness ranging from 0.18 to 3.74 mm (0.007 to 0.147 inch), such as 0.18 to 1.11 mm (0.007 to 0.044 inch), 0.31 to 0.80 mm (0.012 to 0.032 inch), 0.31 to 0.63 mm (0.012 to 0.025 inch), in some cases, 0.31 to 0.55 mm (0.012 to 0.022 inch). As used in this specification, the term "sheathing" refers to a covering placed over a wall frame that that forms a surface onto which other materials can be applied.

In fact, it was a surprising discovery that employing relatively thinner sheet metal sheathing 90, such as sheet metal sheathing 90 having a thickness 0.31 to 0.63 mm (28 to 24 gauge), could produce wall structures 10 according to this specification that exhibit a racking strength similar to those wall structures 10 in which sheet metal sheathing employed is significantly thicker, such as 0.8 mm (20 gauge) thick sheet metal sheathing 90. In addition, as described in the Examples below, the observed racking strength improvement, particularly in cases where such relatively thin sheet metal sheathing 90 was employed, far exceeded the racking strength improvement expected from simply the additive contributions of foam layer 30 and sheet metal sheathing 90 independently, thereby indicating the presence of a significant synergistic effect resulting from the combination of sheet metal sheathing 90 and foam layer 30, especially in those cases where the relatively thinner sheet metal sheathing 90 was employed. This discovery is beneficial for several reasons, including: (a) thinner sheet metal sheathing 90 is less expensive than using a thicker counterpart, thereby reducing wall structure 10 cost; (b) thinner sheet metal is lower in weight than its thicker counterparts; (c) thinner sheet metal is easier to fabricate, i.e., easier cutting and fastening than its thicker counterparts; and (d) thin sheet metal sheathing 90 negligibly impacts the overall thickness of wall structure 10, thereby allowing for the use of a thicker foam panel 70 overlying the sheet metal sheathing 90 while not impacting the overall thickness of wall structure 10, which, in turn, benefits the thermal insulation properties of the wall structure 10 without detrimental impacting ease of construction or installation of the wall structure 10.

In some implementations, sheet metal sheathing 90 is fastened to the front frame surface 11a. The sheet metal sheathing 90, in some implementations, is mechanically fastened to any of the front faces (12a, 14a, 16a and/or 17a) of the constituent members (12, 14, 16 and 17) of the frame 11. For example, the sheet metal sheathing 90 can be mechanically fastened to the front faces 12a and 14a of the first and second members 12 and 14 and/or to the front faces 16a, 17a of the connecting members 16, 17 extending therebetween. The sheet metal sheathing 90 can be mechanically fastened to the front frame surface 11a with mechanical fasteners 92. "Mechanical fasteners", as will be appreciated, refers to fasteners that rely on some mechanical principle (i.e. not adhesives) and are semi-permanent (i.e. unlike clamps). Attachment mechanical fasteners can include, for example, nails, staples, screws, bolts, or rivets, or a combination of any thereof. Alternatively (or in addition) sheet metal sheathing 90 can be fastened to front frame surface 11a using an adhesive. Attachment adhesives can comprise a construction adhesive that is compatible with the adjoining materials. For example, an adhesive used to fasten sheet metal sheathing 90 to a frame 11 can comprise a foam material (which may be the same foam material or a different foam material as the foam material comprising the foam layer 30, described below).

According to the wall structures of this specification, a foam panel 70 overlies sheet metal sheathing 90. In addition, in some implementations, foam panel 70 may abut sheet metal sheathing 90. As used herein, "abut", when used with reference to foam panel 70 "abutting" sheet metal sheathing 90, means that foam panel 70 at least partially touches sheet metal sheathing 90 so that at least some portion of foam panel 70 is not spaced apart from sheet metal sheathing 90. In other words, in such implementations, foam panel 70 at least partially directly overlies sheet metal sheathing 90 with no gap between them.

By abutting foam panel 70 against sheet metal sheathing 90 as described herein, the wall structures of this specification are easy to assemble. Moreover, and importantly, because sheet metal sheathing 90 is relatively thin, this enables the wall structures described herein to be of essentially the same thickness as other adjacent wall structures that may be employed in the building, such adjacent wall structures not employing the use of a sheet metal sheathing 90 because it may not be necessary. As a result, it is possible to maintain a constant wall thickness relative to other wall structures used in the building, which is typically highly desirable, and this can be done without reducing the amount of thermally insulating foam used.

As a result, this specification is also directed to buildings comprising adjacent wall structures. These buildings comprise: (1) a first wall structure comprising: (a) a frame comprising: (i) a first member; (ii) a second member spaced apart from the first member; and (iii) connecting members extending between the first member and the second member, wherein the first member, the second member, and the connecting members each comprise a front surface and a rear surface that form a front frame surface and a rear frame surface; (b) a sheet metal sheathing having a thickness of 0.18 to 3.74 mm (0.007 to 0.147 inch) overlying the front frame surface such that the sheet metal sheathing, the first member, the second member, and the connecting members define a cavity; (c) a foam panel overlying the sheet metal sheathing; and (d) a foam layer disposed within the cavity, wherein the foam layer adheres to the sheet metal sheathing; and (2) a second wall structure disposed adjacent to the first wall structure, wherein (i) the second wall structure does not include a sheet metal sheathing overlying a front frame surface, and (ii) the thickness of the first wall structure is substantially the same as the thickness of the second wall structure. In some of these implementations, the second wall structure comprises: (a) a frame comprising: (i) a first member; (ii) a second member spaced apart from the first member; and (iii) connecting members extending between the first member and the second member, wherein the first member, the second member, and the connecting members each comprise a front surface and a rear surface that form a front frame surface and a rear frame surface; (b) a foam panel fastened to at least a portion of the front frame surface, wherein the foam panel, the first member, the second member, and the connecting members define a cavity; and (d) a foam layer disposed within the cavity, wherein the foam layer adheres to the foam panel. As used herein, "substantially the same", when used with reference to the thickness of wall structures, means that the difference in the thickness of the wall structures being compared is not more than the thickness of the sheet metal sheathing employed in the first wall structure, which may be any of the thickness described earlier. In some implementations, the second wall structure is a foam wall structure as described in U.S. Pat. No. 10,370,849 at col. 5, line 25 to col. 10, line 2, the cited portion of which being incorporated herein by reference.

As used in this specification, the term "foam panel" refers to panels comprising foam, such as, for example, polyisocyanurate (sometimes referred to as "polyiso") foam panels, expanded polystyrene foam panels, and extruded polystyrene foam panels. As will be appreciated, such foam panels have relatively low fastener pull-out strength as compared to wood panels, plywood panels, and OSBs. Accordingly, "foam panel" as used in this specification, is to be distinguished from wood panels, plywood panels, and OSBs, for example. As used herein, "foam" refers to a substance that is formed by trapping pockets of gas in a liquid or solid. In certain embodiments, the foams described in this specification are "closed-celled" foams. The term "closed-celled foam", as used in this specification, means that the foam has a closed cell content of at least 80%, sometimes at least 90%, when measured according to ASTM D6226-15, which is incorporated herein by reference. In certain embodiments, the foams described in this specification are "rigid" foams. The term "rigid foam" refers to a foam having a ratio of compressive strength to tensile strength of at least 0.5:1, elongation of less than 10%, and a low recovery rate from distortion and a low elastic limit, as described in "Polyurethanes: Chemistry and Technology, Part II Technology," J. H. Saunders & K. C. Frisch, Interscience Publishers, 1964, page 239, which is incorporated herein by reference. The term "panel", as used in this specification, refers to a solid, relatively thin and flat slab of material, which in some cases, has a rectangular or square shape. In some embodiments, the foam panels described herein have a thickness of no more than 2 inches (5.08 cm), such as a thickness of 1 to 2 inches (2.54 to 5.08 cm) or 1 to 1.5 inches (2.54 cm to 3.81 cm).

The foam panel 70 overlying sheet metal sheathing 90 can comprise a facer on a rear face and/or a front face of a core foam layer. Thus, as will be appreciated, in these implementations, a facer on the rear face of the core foam layer of the foam panel 70 abuts and overlies sheet metal sheathing 90. In this specification, such a facer is to be understood to be a distinct component that forms part of foam panel 70 and is not sheet metal sheathing 90.

For example, the foam panel 70 may comprise a polyiso panel comprising a polyisocyanurate foam core layer and a facer attached to a front face and/or a rear face of the polyisocyanurate foam core layer. In certain implementations, the facer is attached to and substantially covers both sides (the front and rear faces) of a polyisocyanurate foam core layer or other foam core layer. For example, facers can comprise glass mats filled with recycled cardpanel and colored with carbon black. Facers can also comprise foil or foil/glass composites. Facers can also comprise fibrous materials such as fiberglass materials or other fiber-reinforced sheet-like materials. Examples of suitable facers include, but are not limited to, fiberglass mats, glass fiber-reinforced cellulosic felts, coated and polymer-bonded fiber mats (e.g., fibrous glass mats bonded with an organic polymer binder and coated with an organic polymer coating, clay, or other inorganic coating), foils (e.g., aluminum foil), coated foils, foil/membrane laminates, foil/glass composites, and polyolefin films (such as TYVEK® materials, available from DuPont; or TYPAR® materials, available from Fiberweb, Inc.). If a polyiso panel or other type of foam panel comprises a facer on both the front and rear faces of the polyisocyanurate foam layer or other core layer, then the facer on the front face may be the same as or may be different than the facer on the rear face. In some implementations, the facer acts as a water-resistant barrier. In some implementations, the facer meets the requirements as described in ASTM D226/D226M-09: Standard Specification for Asphalt-Saturated Organic Felt Used in Roofing and Waterproofing; or ASTM E2556/E2556M-10: Standard Specification for Vapor Permeable Flexible Sheet Water-Resistive Barriers Intended for Mechanical Attachment; or otherwise qualifies as a water-resistive barrier in accordance with International Residential Code (IRC) 703.2 (2012), which are each incorporated by reference into this specification. For embodiments in which the foam panel comprises a polyiso panel, the foam panel may meet the requirements of ASTM C1289-15: Standard Specification for Faced Rigid Cellular Polyisocyanurate Thermal Insulation Panel, which is incorporated by reference into this specification.

The foam panel 70 is typically fastened to sheet metal sheathing 90 and front frame surface 11a. The foam panel 70 can be fastened to the sheet metal sheathing 90 with fasteners and/or an adhesive. Mechanical fasteners can include, but are not limited to, nails, staples, screws, bolts, or rivets, or a combination of any thereof. In some implementations, foam panel 70 is fastened to sheet metal sheathing 90 by using mechanical fasteners. Such mechanical fasteners, in some implementations, have a length greater than mechanical fasteners that may be used to fasten sheet metal sheathing 90 to the front frame surface 11a. Alternatively, or in addition, foam panel may be fastened to sheet metal sheathing 90 (and, as a result, front frame surface 11a via sheet metal sheathing 90) using a construction adhesive that is compatible with the adjoining materials. For example, an adhesive used to fasten a foam panel 70 to a sheet metal sheathing 90 can comprise a foam material (which may be the same foam material or a different foam material as the foam material comprising the foam layer, described below).

The sheet metal sheathing 90, the first member 12, the second member 14, and the connecting members 16, 17 define a cavity within the frame 11. A foam layer 30 is located within the cavity. The foam layer 30 adheres to the sheet metal sheathing 90 and covers at least a portion of the rear surface of the sheet metal sheathing 90. In certain implementations, the foam layer 30 does not extend out from and/or overlie the front frame surface 11a.

The foam layer 30 can comprise, for example, polyurethane, polyurea, or polyisocyanurate, or a mixture thereof. The foam layer 30 can be substantially free, essentially free, or completely free of halogen-containing flame retardant additives.

Examples of foam materials include, but are not limited to, foams made with polyurethane, polyurea, polyisocyanurate (also referred to as polyiso), and mixtures thereof. Foam materials (including the foam layer 30) may be substantially free, may be essentially free, or may be completely free of halogen-containing flame retardant additives. The term "halogen" refers to the halogen elements, which include fluorine, chlorine, bromine, and iodine, and the term "halogen-containing flame retardant additives" refers to a substance that may be used to inhibit or resist the spread of fire, and which contains halogen groups such as a fluoro, chloro, bromo, and/or iodo groups. Further, the term "substantially free," as used in this specification, means the foam material contains less than 1000 parts per million (ppm), "essentially free" means less than 100 ppm, and "completely free" means less than 20 parts per billion (ppb) of halogen-containing flame retardant additives.

In certain embodiments, the foam layer 30 has a fairly high density. More particularly, in certain embodiments, the density of the foam layer 30 is at least 2.8 lb/ft$^3$ (44.9 kg/m$^3$), such as 2.8 to 4.0 lb/ft$^3$ (44.9 to 64.1 kg/m3), or, in some cases, 3.0 to 4.0 lb/ft$^3$ (48.1 to 64.1 kg/m$^3$) or 3.2 to 3.8 lb/ft$^3$ (51.3 to 60.9 kg/m$^3$) or 3.4 to 3.8 lb/ft$^3$ (54.5 to 60.9 kg/m$^3$), when measured according to ASTM D1622-08.

As illustrated in the Figures, in some embodiments foam layer 30 has a thickness extending from the rear surface of sheet metal sheathing 90 to a position intermediate the front frame surface 11a and the rear frame surface 11b. In this manner, a gap 40 may be formed within the frame 11 between a rear surface of the foam layer 30 and the rear frame surface 11b. Although the Figures show the foam layer 30 comprising a thickness extending from the rear surface of sheet metal sheathing 90 to a position intermediate the front frame surface 11a and the rear frame surface 11b, it is understood that the foam layer 30 can alternatively comprise a thickness extending from the rear surface of sheet metal sheathing 90 to the rear frame surface 11b, in which case there may be no gap formed within the frame 11 between the rear surface of the foam layer 30 and the rear frame surface 11b. In some embodiments, gap 40 has a width, from the rear surface of the foam layer to the rear frame surface 11b, of at least 1 inch (2.54 cm), such as 1 to 2 inches (2.54 to 5.08 cm) or 1.5 to 2 inches (3.81 to 5.08 cm).

This specification also relates to methods for manufacturing foam wall structures. The methods comprise depositing a foam-forming material into a cavity of the wall structure so that the foam-forming material forms a foam layer that adheres to a rear surface of a sheet metal sheathing that has a thickness of 0.31 to 4.55 mm (0.012 to 0.179 inch), wherein the sheet metal sheathing overlies a front surface of a frame of the wall structure, the frame being formed by a front surface of a first member, a front surface of a second member that is spaced apart from the first member, and a front surface of connecting members extending between the first member and the second member and the sheet metal sheathing is fastened to the front frame surface such that the sheet metal sheathing, the first member, the second member, and the connecting members define a cavity; and wherein a foam panel overlies the sheet metal sheathing.

For example, in some implementations, sheet metal sheathing 90 can be mechanically fastened to the front frame surface 11a while the frame 11 is positioned substantially horizontally, such as where the frame 11 is positioned on a framing table where the frame 11 may be constructed. As used herein, the phrase "substantially horizontal" when used with reference to the position of the frame when the foam panel is attached means that the longest dimension of each of the frame members 12, 14, 16 and 17 is positioned generally horizontally, though modest deviations from true horizontal of to 30°, in some cases up to 20° or up to 10° are also encompassed by the term "substantially horizontal".

The framing table may hold the frame members in the required position while they are attached to each other using suitable fasteners. A framing table can help ensure that frame members are attached to each other at the perpendicular and parallel positions to each other (if desired) and therefore can also ensure that the sheet metal sheathing 90 and foam panel 70 when attached to the frame 11 are installed in the same plane. This means that the surfaces 12a, 14a, 16a, 17a, are in the same plane and flat and flush so that the gap between these surfaces and the sheet metal sheathing 90 and the foam panel 70 is minimized; making it easier to attach the sheet metal sheathing 90 and foam panel 70 in the desired position on the frame 11.

In certain implementations, after ensuring correct attachment of the framing members, the frame 11 may, if desired, be moved on to a tilting device, such as a tiltable platform. Such a tilting device receives the frame 11 in a substantially horizontal position and is capable of placing the frame 11 having the sheet metal sheathing 90 and foam panel 70 fastened thereto on a conveyor configured to convey the frame 11 having the sheet metal sheathing 90 and foam panel 70 fastened thereto in a substantially upright position. In some embodiments, frame 11 may rest on a tiltable platform that is oriented substantially horizontally while the sheet metal sheathing 90 and the foam panel 70 are fastened to the front frame surface 11a of the frame 11.

In some implementations, sheet metal sheathing 90 is mechanically fastened to the front frame surface 11a. The sheet metal sheathing 90 can be mechanically fastened to any of the front faces (12a, 14a, 16a and/or 17a) of the constituent members (12, 14, 16, and 17) of the frame 11. For example, the sheet metal sheathing 90 can be mechanically fastened to the front faces 12a and 14a of the first and second members 12 and 14 and/or to the front faces 16a, 17a of the connecting members 16, 17 extending therebetween. The sheet metal sheathing 90 can be mechanically fastened to the front frame surface 11a with mechanical fasteners 92 (see the Figures). Attachment fasteners can include, but are not limited to, nails (as depicted in the Figures), staples, screws, bolts, or rivets, or a combination of any thereof.

According to certain methods of this specification, foam panel 70 is oriented so as to abut the sheet metal sheathing 90 and to overlay the sheet metal sheathing 90.

In some implementations, the methods comprise fastening the foam panel 70 to the front frame surface 11a of, for example, a substantially horizontally positioned frame. As described above with respect to sheet metal sheathing 90, a foam panel 70 can be fastened to the front frame surface 11a having sheet metal sheathing 90 fastened thereto, while the frame 11 is positioned substantially horizontally, such as where the frame 11 is on a framing table where the frame 11 may be constructed.

In certain implementations of the methods of this specification, foam panel 70 is attached to the front frame surface 11a using mechanical fasteners. In some implementations, foam panel 70 and sheet metal sheathing 90 may be fastened to front frame surface 11a sequentially, such that foam panel 70 is fastened to sheet metal sheathing 90 that has previously been fastened to front frame surface 11a. In such a case, mechanical fasteners used to attach foam panel 70 to front frame surface 11a may have a length greater than mechanical fasteners used to attach sheet metal sheathing 90 to front frame surface 11a. In either case, foam panel 70 may abut sheet metal sheathing 90 and overlie sheet metal sheathing 90 and is fastened to any of the front faces (12a, 14a, 16a and/or 17a) of the constituent members (12, 14, 16, and 17) of the frame 11 via sheet metal sheathing 90. Because foam panel 70 may comprise polyisocyanurate foam or foams having relatively low fastener pull-out strength, care should be used when mechanically fastening a foam panel 70 to frames so as not to damage the foam panels.

In certain implementations, foam panel 70 and/or sheet metal sheathing 90 is attached to the front frame surface 11a by using fasteners, such as SCRAIL® collated nails (commercially available from FASCO America®, Muscle Shoals, Ala.) equipped with a continuous rigid insulation washer (a "CI washer"). Alternatively, the foam panel 70 and/or sheet metal sheathing 90 can be fastened by the use of one or more adhesives selected from latex-based adhesives, reactive hot melts, polyester adhesives, polyamide adhesives, acrylic adhesives, one-component epoxy-based adhesives, one-component polyurethane-based adhesives, two-component polyurethane-based adhesives, and combinations of any thereof. Also, as described, a foam material may be used as the adhesive. For example, a layer of foam may be applied to the foam panel 70, the sheet metal sheathing 90, or both, before positioning and attaching the foam panel 70 to the sheet metal sheathing 90.

The foam panel 70 may comprise multiple separate foam panels (i.e., multiple sections) which may be joined together by tape (such as is described below) or caulk or polyurethane foam at this stage or later in the process.

The methods of this specification comprise depositing a foam-forming material into the cavity so that it adheres to the rear surface 90b of the sheet metal sheathing 90.

In some implementations, this step of the methods described herein comprises placing the frame 11 having the sheet metal sheathing 90 and foam panel 70 fastened thereto on a conveyor, such as a track conveyor that is configured to convey the frame 11 having the sheet metal sheathing 90 and foam panel 70 fastened thereto in a substantially upright position. As used herein, the term "track conveyor" refers to a device configured to convey frame 11 of a wall structure 10 in a substantially upright position and that includes at least one, in some cases more than one, track (or line) along which the frame 11 of a wall structure can travel and upon which the wall structure 10 can rest. The tracks included in the track conveyor utilized in the methods described in this specification can comprise any of a variety of devices to facilitate conveyance of a wall structure 10 along the track(s) in a substantially upright position, such as rollers, balls, bearings, wheels, and belts, among other devices. In some embodiments, however, the tracks of the track conveyor comprise a plurality of rotating members, such as balls (sometimes referred to as ball bearing rollers) or wheels in which the track includes a plurality of such rotating members, i.e., circular objects that revolve on an axle and upon which the frame 11 lies while being conveyed, and which are disposed along the length of the track.

In some implementations, frame 11 having the foam panel 70 attached thereto may be placed on a track conveyor by tilting frame 11 from a substantially horizontal position to a substantially upright position in which frame member rests on a substantially vertically positioned track of the conveyor. An example of such a track conveyor, which is suitable for use in the methods of this specification, is described in U.S. Pat. No. 10,227,779 at col. 10, line 24 to col. 12, line 60, the cited portion of which being incorporated herein by reference.

In these implementations, frame 11 is, in some embodiments, placed on conveyor in a substantially upright position in which rear frame surface 11b faces away from substantially horizontally positioned track(s) of the track conveyor, so that it is completely exposed (i.e., there is no component or device between a spray foam applicator and the rear frame surface 11b, which allows for easy spray foam application over the entire wall structure, as described below), whereas front frame surface 11a faces towards, and may be in direct contact with, substantially horizontally positioned track(s).

The track conveyor is, in some implementations, configured to convey a frame 11 of a wall structure 10 in a substantially upright position. As used herein, "substantially upright position" when used with reference to the conveyance of a frame 11 of a wall structure means that the longest dimension of at least one of the frame members 12, 14, 16 and 17 is positioned generally perpendicular to the direction of gravity but not exactly perpendicular to the direction of gravity. For example, in some cases "substantially vertical" in this context means that the longest dimension of at least one of the frame members 12, 14, 16 and 17 is positioned at a slope of 75° to 88° from the direction of gravity, such as 78° to 88° from the direction of gravity, or, in some cases, 80° to 86° or 81° to 85° from the direction of gravity.

Some implementations of the methods of this specification comprise conveying the frame 11 having the sheet metal sheathing 90 fastened thereto and foam panel 70 overlying and attached to sheet metal sheathing 90 on the track conveyer, in a substantially upright position, to a spray foam application station where a foam-forming material is spray applied into the cavity so that the foam-forming material adheres to the rear surface of the sheet metal sheathing 90 to thereby form a wall structure 10 having a foam layer 30 deposited in the cavity 18 in which the foam layer 30 adheres to sheet metal sheathing 90.

Various spray application devices can be used to spray the foam composition into the cavity 18. One suitable device is a Fusion CS plural-component spray gun commercially available from Graco Inc. As will be appreciated, polyurethane foam is formed from combining a polyol component that typically comprises one or more polyols and other additives, such as blowing agents and flame retardants, among others, and a polyisocyanate component. In these cases, it is often desirable that the polyol component and polyisocyanate component be metered and mixed in a plural-component spray gun at a 1:1 volume ratio.

Examples of foam materials that can be used as foam layer 30 include, for example, the materials described earlier. In some implementations, the foam layer 30 is spray applied such that it has a thickness extending from the rear surface of the sheet metal sheathing 90 to a position intermediate the front frame surface 11*a* and the rear frame surface 11*b*. In this manner, a gap 40 is formed within the frame 11 between a rear surface of the foam layer 30 and the rear frame surface 11*b*. In some embodiments, the gap 40 has a width, from the rear surface of the foam layer 30*b* to the rear frame surface 11*b*, of at least 1 inch (2.54 cm), such as 1 to 4.5 inches (2.54 to 11.43 cm), 1 to 2 inches (2.54 to 5.08 cm) or 1.5 to 2 inches (3.81 to 5.08 cm). In some embodiments, the foam layer 30 is deposited as a substantially continuous layer within the cavity 18 to provide optimal insulating properties. The gap 40 can be used as an area to incorporate home utility components such as electrical wires, cords, heating and cooling pipes, and plumbing fixtures. These home utility components may be inserted into the gap 40 located between the foam layer 30 and the rear frame surface 11*b* such that utilities components are not surrounded by or contacting the foam layer 30. In one example, the gap 40 comprises at least two inches as measured between the foam layer 30 and the rear frame surface 11*b*.

The foam layer 30 is thus formed in-situ during the manufacturing process of the wall structure 10. The term "formed in-situ during the manufacturing process," as used herein, refers to the formation of a foam layer 30 as described in this specification during manufacturing of the wall structure 10 off-site at a facility remote or away from a building construction site. As such, the foam layer 30 may be formed not at a construction site as is required by conventional methods, but instead as a component of the pre-fabricated foamed wall structure 10.

The foam layer 30 is able to fill tight spaces and seal gaps that may not be visible to the naked eye. The foam layer 30 can also act as a vapor and thermal insulating barrier, which reduces energy consumption in buildings and residential homes when the wall structure 10 is used as a constituent wall panel. The foam layer 30 may provide structural stability to the wall structure 10, such as improved wall racking strength, which refers to the ability of a wall structure to maintain its shape under shear stress.

After the foam layer 30 has expanded and cured, the substantially upright positioned wall structure 10 can be conveyed out of the spray foam application station on the track conveyer. Thereafter, if desired, foam layer 30 can be deflashed to remove excess foam material, such as any foam material that is deposited on the rear frame surface 11*b*. Deflashing can be done while the wall structure 10 is in a substantially upright position on the track conveyer, if desired. Various devices can be used for deflashing, such as a hoe or curry comb.

In cases where the wall structure 10 comprises two or more foam panels 70 adjacent with one another. A sealant, such as a tape (or other sealant material, such as a liquid sealer) can be applied to front surfaces of the foam panels 70 and over seams formed at adjacent sides of two foam panels 70.

Various aspects of the subject matter described herein are set out in the following numbered clauses:

Clause 1. A wall structure comprising: (a) a frame comprising: (i) a first member; (ii) a second member spaced apart from the first member; and (iii) connecting members extending between the first member and the second member, wherein the first member, the second member, and the connecting members each comprise a front surface and a rear surface that form a front frame surface and a rear frame surface; (b) a sheet metal sheathing having a thickness of 0.18 to 3.74 mm (0.007 to 0.147 inch) overlying the front frame surface such that the sheet metal sheathing, the first member, the second member, and the connecting members define a cavity; (c) a foam panel overlying the sheet metal sheathing; and (d) a foam layer disposed within the cavity, wherein the foam layer adheres to the sheet metal sheathing.

Clause 2. The wall structure of clause 1, wherein the sheet metal sheathing abuts the front frame surface.

Clause 3. The wall structure of clause 1 or clause 2, wherein the sheet metal sheathing comprises a ferrous metal, such as carbon steel, galvanized steel, galvannealed steel, and stainless steel, aluminum, brass, copper, tin, nickel, or titanium.

Clause 4. The wall structure of one of clause 1 to clause 3, wherein the sheet metal sheathing has a thickness of 0.18 to 1.11 mm (0.007 to 0.044 inch), 0.31 to 0.80 mm (0.012 to 0.032 inch), 0.31 to 0.63 mm (0.012 to 0.025 inch), or 0.31 to 0.55 mm (0.012 to 0.022 inch).

Clause 5. The wall structure of one of clause 1 to clause 4, wherein the sheet metal sheathing is fastened to the front frame surface.

Clause 6. The wall structure of clause 5, wherein the sheet metal sheathing is mechanically fastened to the front frame surface with mechanical fasteners, such as nails, staples, screws, bolts, or rivets, or a combination of any thereof.

Clause 7. The wall structure of clause 5 or clause 6, wherein the sheet metal sheathing is fastened to front frame surface with an adhesive, such as a foam material, such as the foam layer.

Clause 8. The wall structure of one of clause 1 to clause 7, wherein the foam panel abuts the sheet metal sheathing Clause 9. The wall structure of one of clause 1 to clause 8, wherein the foam panel comprises polyisocyanurate foam or polystyrene foam.

Clause 10. The wall structure of one of clause 1 to clause 9, wherein the foam panel comprises closed-cell foam having a closed cell content of at least 80% or at least 90%, when measured according to ASTM D6226-15.

Clause 11. The wall structure of one of clause 1 to clause 10, wherein the foam panel comprises rigid foam having a ratio of compressive strength to tensile strength of at least 0.5:1 and an elongation of less than 10%.

Clause 12. The wall structure of one of clause 1 to clause 11, wherein the foam panel has a thickness of no more than 2 inches (5.08 cm), of 1 to 2 inches (2.54 to 5.08 cm) or of 1 to 1.5 inches (2.54 cm to 3.81 cm).

Clause 13. The wall structure of one of clause 1 to clause 12, wherein the foam panel comprises a facer on a rear face and/or a front face of a core foam layer, such as where the facer is attached to and substantially covers both sides (the front and rear faces) of a core foam layer.

Clause 14. The wall structure of clause 13, wherein the facer comprises a glass mat filled with recycled cardpanel and colored with carbon black, a fiberglass mat, a glass fiber-reinforced cellulosic felt, a coated and polymer-bonded fiber mat, a foil, such as aluminum foil, a coated foil, a foil/membrane laminate, a foil/glass composite, or a polyolefin film.

Clause 15. The wall structure of clause 13 or clause 14, wherein the facer meets the requirements described in ASTM D226/D226M-09: Standard Specification for Asphalt-Saturated Organic Felt Used in Roofing and Waterproofing; or ASTM E2556/E2556M-10: Standard Specification for Vapor Permeable Flexible Sheet Water-Resistive Barriers Intended for Mechanical Attachment; or otherwise qualifies as a water-resistive barrier in accordance with International Residential Code (IRC) 703.2 (2012).

Clause 16. The wall structure of one of clause 1 to clause 15, wherein the foam panel is fastened to the sheet metal sheathing and the front frame surface with mechanical fasteners, such as nails, staples, screws, bolts, or rivets, or a combination of any thereof, and/or an adhesive.

Clause 17. The wall structure of clause 16, wherein the foam panel is fastened to sheet metal sheathing and the front frame surface using mechanical fasteners having a length greater than the length of mechanical fasteners used to attach the sheet metal sheathing to the front frame surface.

Clause 18. The wall structure of one of clause 1 to clause 17, wherein the foam layer does not extend out from and/or overlie the front frame surface.

Clause 19. The wall structure of one of clause 1 to clause 18, wherein the foam layer comprises polyurethane, polyurea, or polyisocyanurate, or a mixture thereof.

Clause 20. The wall structure of one of clause 1 to clause 19, wherein the foam layer is substantially free, essentially free, or completely free of halogen-containing flame retardant additives.

Clause 21. The wall structure of one of clause 1 to clause 20, wherein the foam layer has a density of at least 2.8 lb/ft$^3$ (44.9 kg/m$^3$), of 2.8 to 4.0 lb/ft$^3$ (44.9 to 64.1 kg/m3), of 3.0 to 4.0 lb/ft$^3$ (48.1 to 64.1 kg/m$^3$), of 3.2 to 3.8 lb/ft$^3$ (51.3 to 60.9 kg/m$^3$) or of 3.4 to 3.8 lb/ft$^3$ (54.5 to 60.9 kg/m$^3$), when measured according to ASTM D1622-08.

Clause 22. The wall structure of one of clause 1 to clause 21, wherein the foam layer has a thickness extending from the rear surface of sheet metal sheathing to a position intermediate the front frame surface and the rear frame surface, thereby forming a gap within the frame between a rear surface of the foam layer and the rear frame surface, such as where the gap has a width, from the rear surface of the foam layer to the rear frame surface, of at least 1 inch (2.54 cm), of 1 to 2 inches (2.54 to 5.08 cm) or of 1.5 to 2 inches (3.81 to 5.08 cm).

Clause 23. A method of manufacturing a foam wall structure comprising depositing a foam-forming material into a cavity of the wall structure so that the foam-forming material forms a foam layer that adheres to a rear surface of a sheet metal sheathing that has a thickness of 0.18 to 3.74 mm (0.007 to 0.147 inch), wherein the sheet metal sheathing overlies a front surface of a frame of the wall structure, the frame being formed by a front surface of a first member, a front surface of a second member that is spaced apart from the first member, and a front surface of connecting members extending between the first member and the second member and the sheet metal sheathing is fastened to the front frame surface such that the sheet metal sheathing, the first member, the second member, and the connecting members define a cavity; and wherein a foam panel overlies the sheet metal sheathing.

Clause 24. The method of clause 23, comprising mechanically fastening the sheet metal sheathing to the front frame surface while the frame is positioned substantially horizontally, such as where the frame is positioned on a framing table.

Clause 25. The method of clause 24 further comprising moving the frame on to a tilting device, such as a tiltable platform that receives the frame in a substantially horizontal position and places the frame having the sheet metal sheathing and foam panel fastened thereto on a conveyor configured to convey the frame having the sheet metal sheathing and foam panel fastened thereto in a substantially upright position, such as where the frame rests on the tiltable platform that is oriented substantially horizontally while the sheet metal sheathing and the foam panel are fastened to the front frame surface.

Clause 26. The method of one clause 23 to clause 25, wherein comprise fastening the foam panel to the front frame surface while the frame is positioned substantially horizontally, such as where the frame is on a framing table where the frame may be constructed.

Clause 27. The method of one of clause 23 to clause 26, wherein the foam panel and sheet metal sheathing are fastened to front frame surface simultaneously.

Clause 28. The method of one of clause 23 to clause 27, comprising placing the frame having the sheet metal sheathing and foam panel fastened thereto on a conveyor, such as a track conveyor configured to convey the frame having the sheet metal sheathing and foam panel fastened thereto in a substantially upright position, such as where the frame is placed on the conveyor in a substantially upright position in which rear frame surface faces away from substantially horizontally positioned track(s) of the track conveyor, so that it is completely exposed and front frame surface faces towards, and may be in direct contact with, substantially horizontally positioned track(s).

Clause 29. The method of one of clause 23 to clause 28, comprising conveying the frame having the sheet metal sheathing fastened thereto and foam panel overlying and attached to sheet metal sheathing on the track conveyer, in a substantially upright position, to a spray foam application station where a foam-forming material is spray applied into the cavity so that the foam-forming material adheres to the rear surface of the sheet metal sheathing.

Clause 30. The method of one of clause 23 to clause 29, wherein the sheet metal sheathing abuts the front frame surface.

Clause 31. The method of one of clause 23 or clause 30, wherein the sheet metal sheathing comprises a ferrous metal, such as carbon steel, galvanized steel, galvannealed steel, and stainless steel, aluminum, brass, copper, tin, nickel, or titanium.

Clause 32. The method of one of clause 23 to clause 31, wherein the sheet metal sheathing has a thickness of 0.18 to 1.11 mm (0.007 to 0.044 inch), 0.31 to 0.80 mm (0.012 to 0.032 inch), 0.31 to 0.63 mm (0.012 to 0.025 inch), or 0.31 to 0.55 mm (0.012 to 0.022 inch).

Clause 33. The method of one of clause 23 to clause 32, wherein the sheet metal sheathing is fastened to the front frame surface.

Clause 34. The method of clause 33, wherein the sheet metal sheathing is mechanically fastened to the front frame surface with mechanical fasteners, such as nails, staples, screws, bolts, or rivets, or a combination of any thereof.

Clause 35. The method of clause 33 or clause 34, wherein the sheet metal sheathing is fastened to front frame surface with an adhesive, such as a foam material, such as the foam layer.

Clause 36. The method of one of clause 23 to clause 35, wherein the foam panel abuts the sheet metal sheathing Clause 37. The method of one of clause 23 to clause 36, wherein the foam panel comprises polyisocyanurate foam or polystyrene foam.

Clause 38. The method of one of clause 23 to clause 37, wherein the foam panel comprises closed-cell foam having a closed cell content of at least 80% or at least 90%, when measured according to ASTM D6226-15.

Clause 39. The method of one of clause 23 to clause 38, wherein the foam panel comprises rigid foam having a ratio of compressive strength to tensile strength of at least 0.5:1 and an elongation of less than 10%.

Clause 40. The method of one of clause 23 to clause 39, wherein the foam panel has a thickness of no more than 2 inches (5.08 cm), of 1 to 2 inches (2.54 to 5.08 cm) or of 1 to 1.5 inches (2.54 cm to 3.81 cm).

Clause 41. The method of one of clause 23 to clause 40, wherein the foam panel comprises a facer on a rear face and/or a front face of a core foam layer, such as where the facer is attached to and substantially covers both sides (the front and rear faces) of a core foam layer.

Clause 42. The method of clause 41, wherein the facer comprises a glass mat filled with recycled cardpanel and colored with carbon black, a fiberglass mat, a glass fiber-reinforced cellulosic felt, a coated and polymer-bonded fiber mat, a foil, such as aluminum foil, a coated foil, a foil/membrane laminate, a foil/glass composite, or a polyolefin film.

Clause 43. The method of clause 41 or clause 42, wherein the facer meets the requirements described in ASTM D226/D226M-09: Standard Specification for Asphalt-Saturated Organic Felt Used in Roofing and Waterproofing; or ASTM E2556/E2556M-10: Standard Specification for Vapor Permeable Flexible Sheet Water-Resistive Barriers Intended for Mechanical Attachment; or otherwise qualifies as a water-resistive barrier in accordance with International Residential Code (IRC) 703.2 (2012).

Clause 44. The method of one of clause 23 to clause 43, wherein the foam panel is fastened to the sheet metal sheathing and the front frame surface with mechanical fasteners, such as nails, staples, screws, bolts, or rivets, or a combination of any thereof, and/or an adhesive.

Clause 45. The method of clause 44, wherein the foam panel is fastened to sheet metal sheathing and the front frame surface using mechanical fasteners having a length greater than the length of mechanical fasteners used to attach the sheet metal sheathing to the front frame surface.

Clause 46. The method of one of clause 23 to clause 45, wherein the foam layer does not extend out from and/or overlie the front frame surface.

Clause 47. The method of one of clause 23 to clause 46, wherein the foam layer comprises polyurethane, polyurea, or polyisocyanurate, or a mixture thereof.

Clause 48. The method of one of clause 23 to clause 47, wherein the foam layer is substantially free, essentially free, or completely free of halogen-containing flame retardant additives.

Clause 49. The method of one of clause 23 to clause 48, wherein the foam layer has a density of at least 2.8 lb/ft3 (44.9 kg/m3), of 2.8 to 4.0 lb/ft3 (44.9 to 64.1 kg/m3), of 3.0 to 4.0 lb/ft3 (48.1 to 64.1 kg/m3), of 3.2 to 3.8 lb/ft3 (51.3 to 60.9 kg/m3) or of 3.4 to 3.8 lb/ft3 (54.5 to 60.9 kg/m3), when measured according to ASTM D1622-08.

Clause 50. The method of one of clause 23 to clause 49, wherein the foam layer has a thickness extending from the rear surface of sheet metal sheathing to a position intermediate the front frame surface and the rear frame surface, thereby forming a gap within the frame between a rear surface of the foam layer and the rear frame surface, such as where the gap has a width, from the rear surface of the foam layer to the rear frame surface, of at least 1 inch (2.54 cm), of 1 to 2 inches (2.54 to 5.08 cm) or of 1.5 to 2 inches (3.81 to 5.08 cm).

Clause 51. A building comprising: (1) a first wall structure comprising: (a) a frame comprising: (i) a first member; (ii) a second member spaced apart from the first member; and (iii) connecting members extending between the first member and the second member, wherein the first member, the second member, and the connecting members each comprise a front surface and a rear surface that form a front frame surface and a rear frame surface; (b) a sheet metal sheathing having a thickness of 0.18 to 3.74 mm (0.007 to 0.147 inch) overlying the front frame surface such that the sheet metal sheathing, the first member, the second member, and the connecting members define a cavity; (c) a foam panel overlying the sheet metal sheathing; and (d) a foam layer disposed within the cavity, wherein the foam layer adheres to the sheet metal sheathing; and (2) a second wall structure disposed adjacent to the first wall structure, wherein (i) the second wall structure does not include a sheet metal sheathing overlying a front frame surface, and (ii) the thickness of the first wall structure is substantially the same as the thickness of the second wall structure.

Clause 52. The building of clause 51, wherein the second wall structure comprises: (a) a frame comprising: (i) a first member; (ii) a second member spaced apart from the first member; and (iii) connecting members extending between the first member and the second member, wherein the first member, the second member, and the connecting members each comprise a front surface and a rear surface that form a front frame surface and a rear frame surface; (b) a foam panel fastened to at least a portion of the front frame surface, wherein the foam panel, the first member, the second member, and the connecting members define a cavity; and (c) a foam layer disposed within the cavity, wherein the foam layer adheres to the foam panel.

Clause 53. The building of clause 52, wherein the sheet metal sheathing abuts the front frame surface.

Clause 54. The building of clause 52 to clause 53, wherein the sheet metal sheathing comprises a ferrous metal, such as carbon steel, galvanized steel, galvannealed steel and stainless steel, aluminum, brass, copper, tin, nickel, or titanium.

Clause 55. The building of one of clause 52 to clause 54, wherein the sheet metal sheathing has a thickness of 0.18 to 1.11 mm (0.007 to 0.044 inch), 0.31 to 0.80 mm (0.012 to 0.032 inch), 0.31 to 0.63 mm (0.012 to 0.025 inch), or 0.31 to 0.55 mm (0.012 to 0.022 inch).

Clause 56. The building of one of clause 52 to clause 55, wherein the sheet metal sheathing is fastened to the front frame surface.

Clause 57. The building of clause 56, wherein the sheet metal sheathing is mechanically fastened to the front frame surface with mechanical fasteners, such as nails, staples, screws, bolts, or rivets, or a combination of any thereof.

Clause 58. The building of clause 56 or clause 57, wherein the sheet metal sheathing is fastened to front frame surface with an adhesive, such as a foam material, such as the foam layer.

Clause 59. The building of one of clause 52 to clause 58, wherein the foam panel abuts the sheet metal sheathing Clause 60. The building of one of clause 52 to clause 59, wherein the foam panel of the first wall structure and/or of the second wall structure comprises polyisocyanurate foam or polystyrene foam.

Clause 61. The building of one of clause 52 to clause 60, wherein the foam panel of the first wall structure and/or the second wall structure comprises closed-cell foam having a closed cell content of at least 80% or at least 90%, when measured according to ASTM D6226-15.

Clause 62. The building of one of clause 52 to clause 61, wherein the foam panel of the first wall structure and/or the second wall structure comprises rigid foam having a ratio of compressive strength to tensile strength of at least 0.5:1 and an elongation of less than 10%.

Clause 63. The building of one of clause 52 to clause 62, wherein the foam panel of the first wall structure and/or the second wall structure has a thickness of no more than 2 inches (5.08 cm), of 1 to 2 inches (2.54 to 5.08 cm) or of 1 to 1.5 inches (2.54 cm to 3.81 cm).

Clause 64. The building of one of clause 52 to clause 63, wherein the foam panel of the first wall structure and/or the second wall structure comprises a facer on a rear face and/or a front face of a core foam layer, such as where the facer is attached to and substantially covers both sides (the front and rear faces) of a core foam layer.

Clause 65. The building of clause 64, wherein the facer comprises a glass mat filled with recycled cardpanel and colored with carbon black, a fiberglass mat, a glass fiber-reinforced cellulosic felt, a coated and polymer-bonded fiber mat, a foil, such as aluminum foil, a coated foil, a foil/membrane laminate, a foil/glass composite, or a polyolefin film.

Clause 66. The building of clause 64 or clause 65, wherein the facer meets the requirements described in ASTM D226/D226M-09: Standard Specification for Asphalt-Saturated Organic Felt Used in Roofing and Waterproofing; or ASTM E2556/E2556M-10: Standard Specification for Vapor Permeable Flexible Sheet Water-Resistive Barriers Intended for Mechanical Attachment; or otherwise qualifies as a water-resistive barrier in accordance with International Residential Code (IRC) 703.2 (2012).

Clause 67. The building of one of clause 52 to clause 66, wherein the foam panel is fastened to the sheet metal sheathing and the front frame surface with mechanical fasteners, such as nails, staples, screws, bolts, or rivets, or a combination of any thereof, and/or an adhesive.

Clause 68. The building of clause 67, wherein the foam panel is fastened to sheet metal sheathing and the front frame surface using mechanical fasteners having a length greater than the length of mechanical fasteners used to attach the sheet metal sheathing to the front frame surface.

Clause 69. The wall structure of one of clause 52 to clause 68, wherein the foam layer of the first wall structure and/or the second wall structure does not extend out from and/or overlie the front frame surface.

Clause 70. The building of one of clause 52 to clause 69, wherein the foam layer of the first wall structure and/or the second wall structure comprises polyurethane, polyurea, or polyisocyanurate, or a mixture thereof.

Clause 71. The building of one of clause 52 to clause 70, wherein the foam layer of the first wall structure and/or the second wall structure is substantially free, essentially free, or completely free of halogen-containing flame retardant additives.

Clause 72. The building of one of clause 52 to clause 71, wherein the foam layer of the first wall structure and/or the second wall structure has a density of at least 2.8 lb/ft3 (44.9 kg/m3), of 2.8 to 4.0 lb/ft3 (44.9 to 64.1 kg/m3), of 3.0 to 4.0 lb/ft3 (48.1 to 64.1 kg/m3), of 3.2 to 3.8 lb/ft3 (51.3 to 60.9 kg/m3) or of 3.4 to 3.8 lb/ft3 (54.5 to 60.9 kg/m3), when measured according to ASTM D1622-08.

Clause 73. The building of one of clause 52 to clause 72, wherein the foam layer of the first wall structure and/or the second wall structure has a thickness extending from the rear surface of sheet metal sheathing to a position intermediate the front frame surface and the rear frame surface, thereby forming a gap within the frame between a rear surface of the foam layer and the rear frame surface, such as where the gap has a width, from the rear surface of the foam layer to the rear frame surface, of at least 1 inch (2.54 cm), of 1 to 2 inches (2.54 to 5.08 cm) or of 1.5 to 2 inches (3.81 to 5.08 cm).

The non-limiting and non-exhaustive examples that follow are intended to further describe various non-limiting and non-exhaustive embodiments without restricting the scope of the embodiments described in this specification.

EXAMPLES

Various wall assemblies were created from a 4 foot wide by 8 foot tall wall frame made with 2×4 lumber and 16 inch on center stud spacing. In those examples where sheathing was fastened to the frame, the sheathing was attached on all horizontal and vertical stud faces using a 3" edge/6" field fastening pattern (fasteners used every 3 inches on the header, footer, and exterior studs and every 6" on the interior studs). For wall assemblies made with sheet metal sheathing the fasteners used to attach the sheathing were galvanized roofing nails of 1¼" length. For wall assemblies made with OSB sheathing, the fasteners used were 8d nails. In those examples where a foam layer was formed in the wall structure cavity, a polyurethane foam forming-composition (commercially available as Hunter PW-STR from Hunter Panels, Portland, Me.) was sprayed into the stud cavities to provide a closed-celled polyurethane foam (cc-SPF) having a density of about 3.2 lb/ft$^3$ (51.3 kg/m$^3$) and a nominal foam thickness of 1½".

In addition, comparative wall structure was also made with no sheathing, no closed-cell polyurethane spray foam, as summarized in Table 1. The resulting walls were tested in an ASTM E72-15 testing fixture. Instead of the progressive loading and relaxation protocol described in ASTM E-72-15, the walls were tested at a constant displacement rate of 0.5"/minute until the ultimate loading force was surpassed. The results are set forth in Table 1.

TABLE 1

| Example | Sheathing Type | Spray Foam Type | Maximum Racking Force, lbs/ft |
|---|---|---|---|
| 1 (comparative) | Polyiso[1] | 1.5" thick cc-SPF | 848 |
| 2 (comparative) | None | 1.5" thick cc-SPF | 516 |
| 3A (comparative) | OSB[2] | None | 1,028 |
| 3B (comparative) | OSB[2] | 1.5" thick cc-SPF | 1,587 |
| 4A (comparative) | GSM-1[3] | None | 1,219 |
| 4B | GSM-1[3] | 1.5" thick cc-SPF | 1,869 |
| 5A (comparative) | GSM-2[4] | None | 835 |
| 5B | GSM-2[4] | 1.5" thick cc-SPF | 1,557 |
| 6A (comparative) | GSM-3[5] | None | 663 |

TABLE 1-continued

| Example | Sheathing Type | Spray Foam Type | Maximum Racking Force, lbs/ft |
|---|---|---|---|
| 6B | GSM-3[5] | 1.5" thick cc-SPF | 1,781 |
| 7A (comparative) | GSM-4[6] | None | 730 |
| 7B | GSM-4[6] | 1.5" thick cc-SPF | 1,590 |

Figure 1:
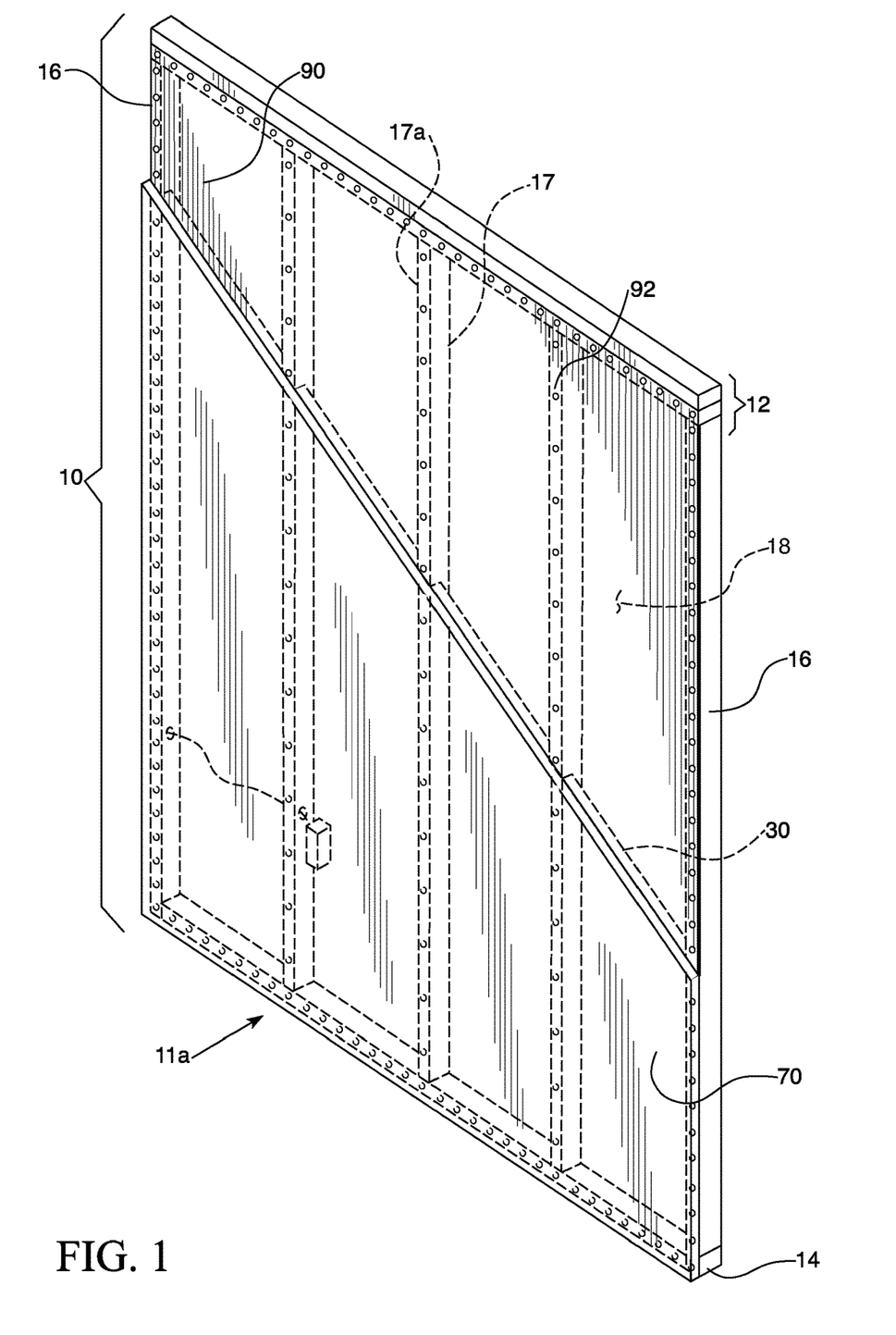
FIG. 1 is a front perspective view of an embodiment of a wall structure of this specification.
Figure 2:
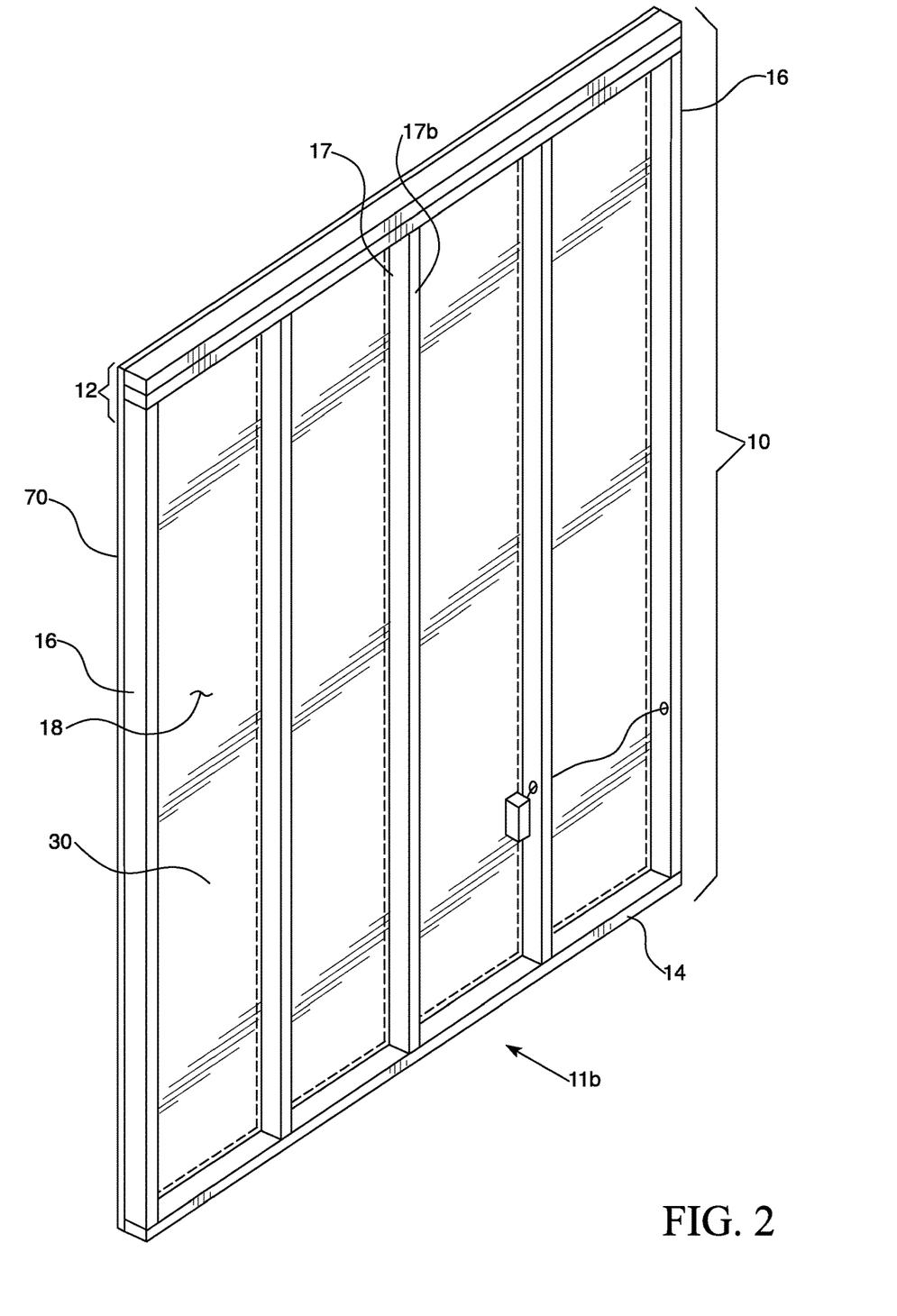
FIG. 2 is a rear perspective view of the foam wall structure of FIG. 1.
Figure 3:
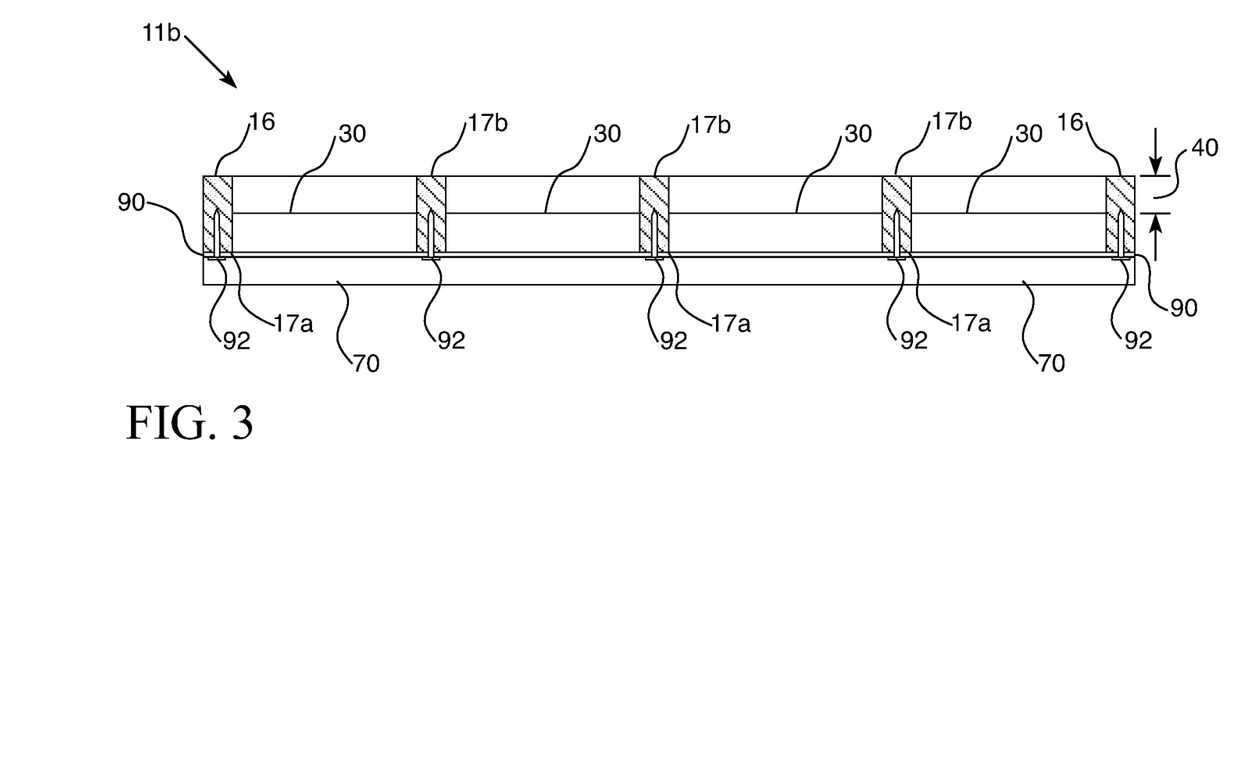
FIG. 3 is a horizontal cross-sectional view of the foam wall structure of FIG. 1
Figure 4:
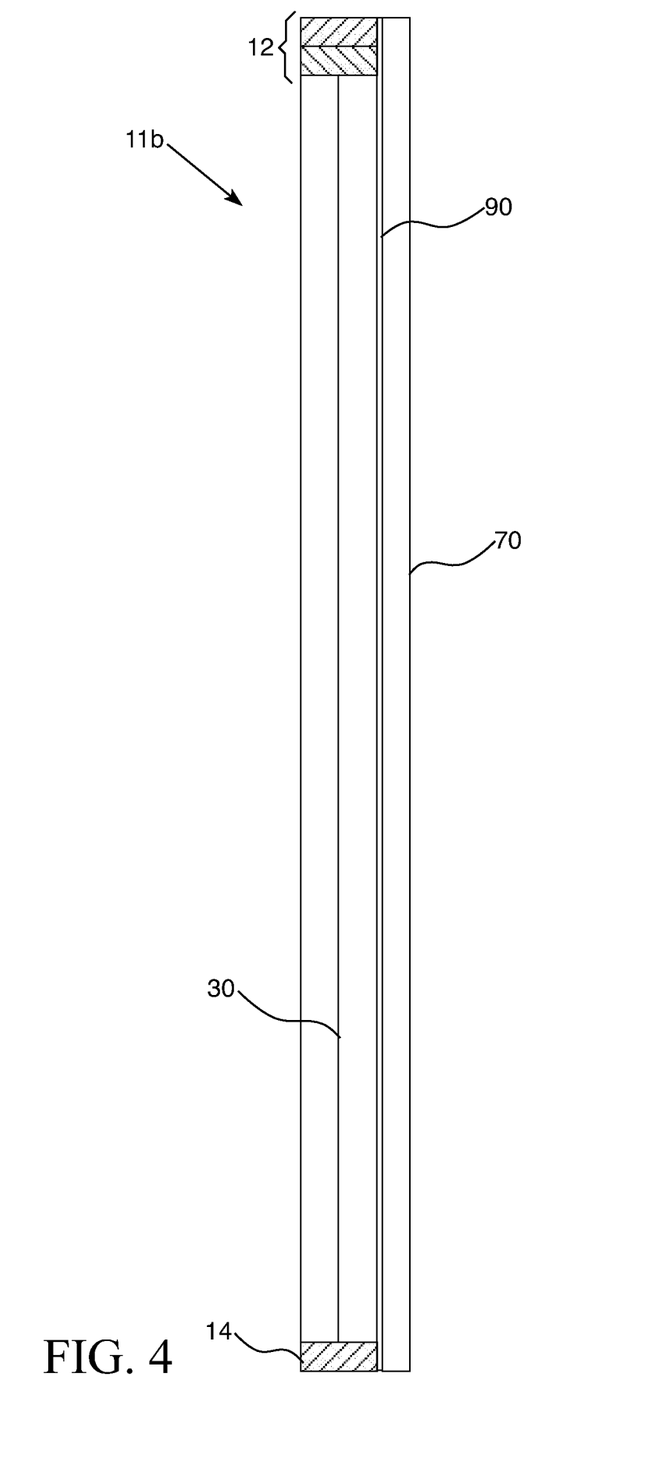
FIG. 4 is a vertical cross-sectional view of the foam wall structure of FIG. 1.
Figure 5:
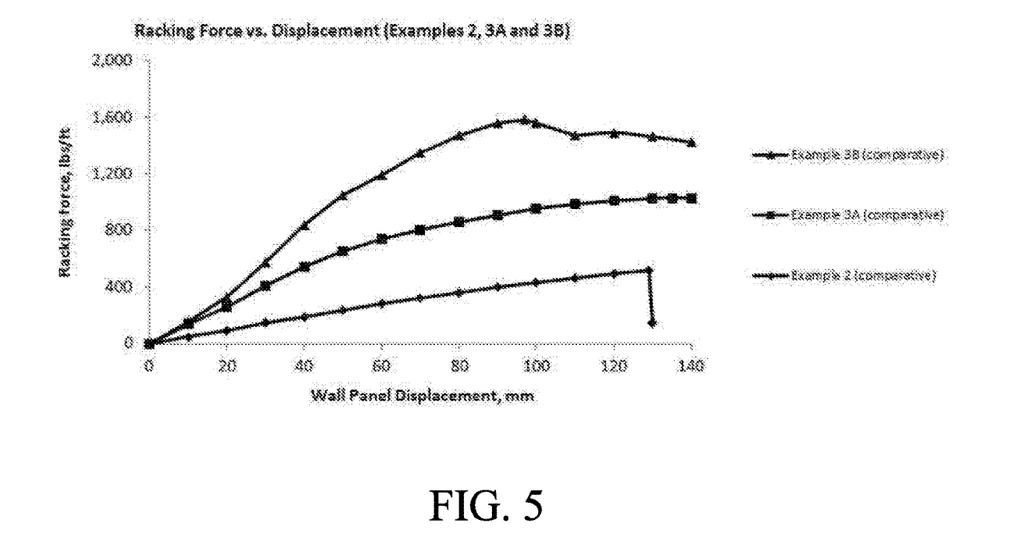
FIGS. 5-9 graphically illustrate results observed from the Examples.
Figure 6:
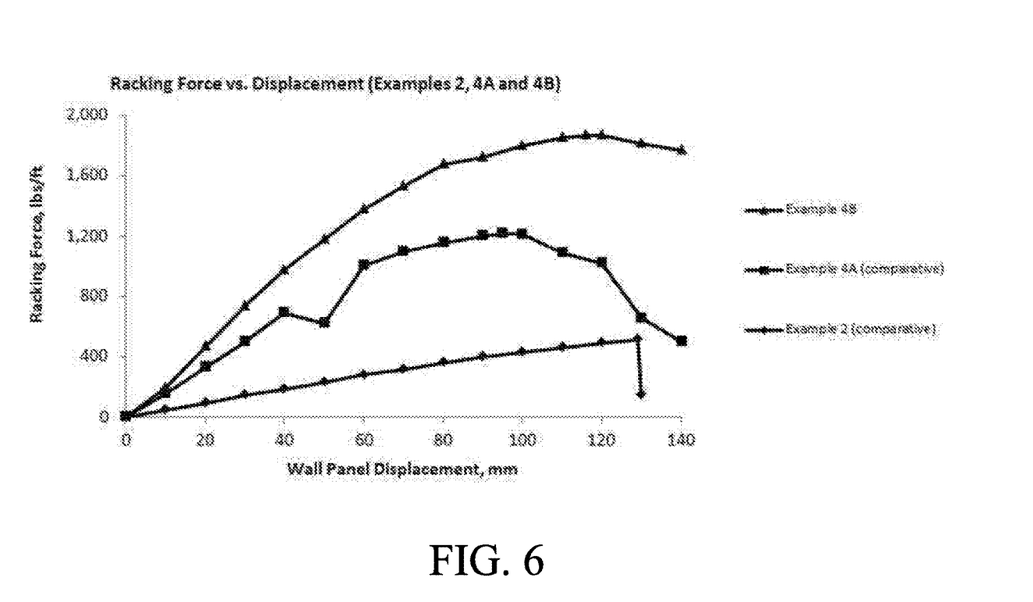
Figure 7:
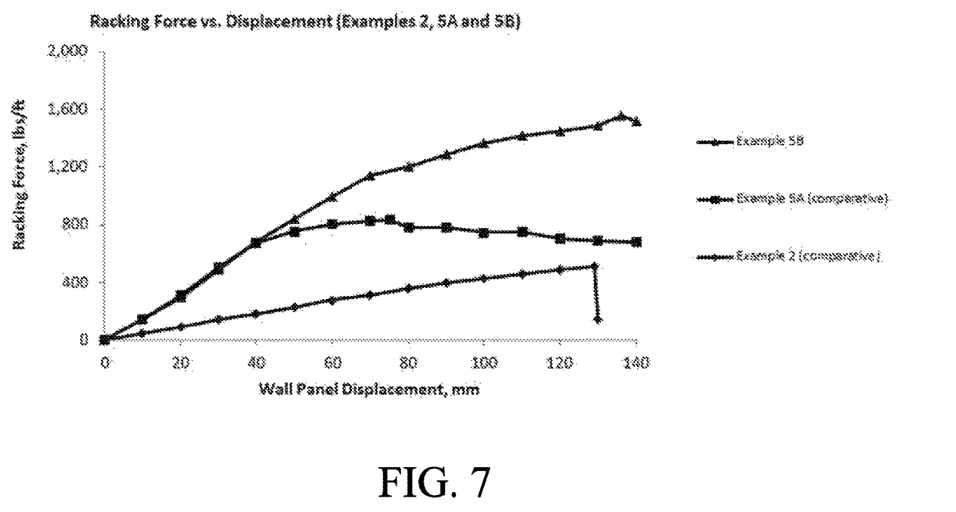
Figure 8:
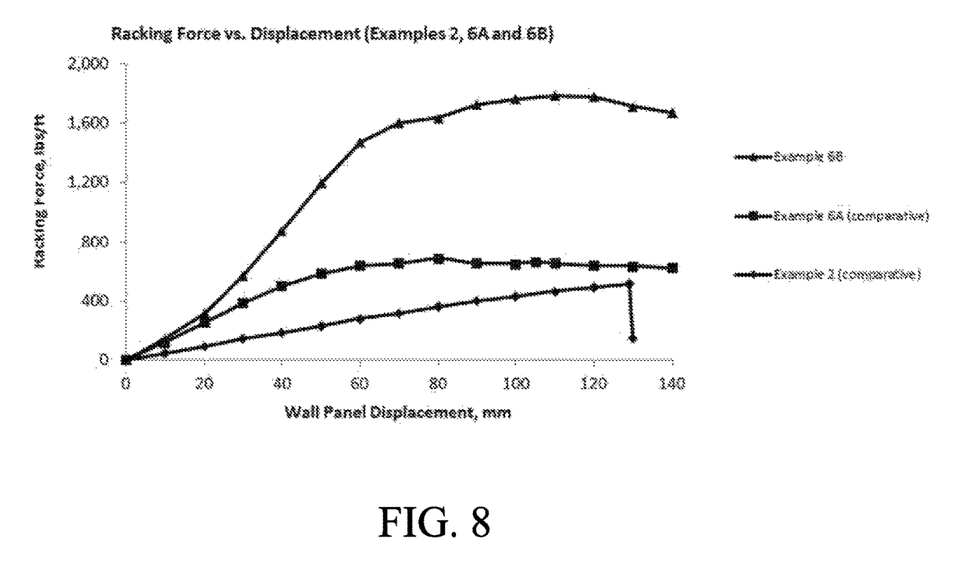
Figure 9:
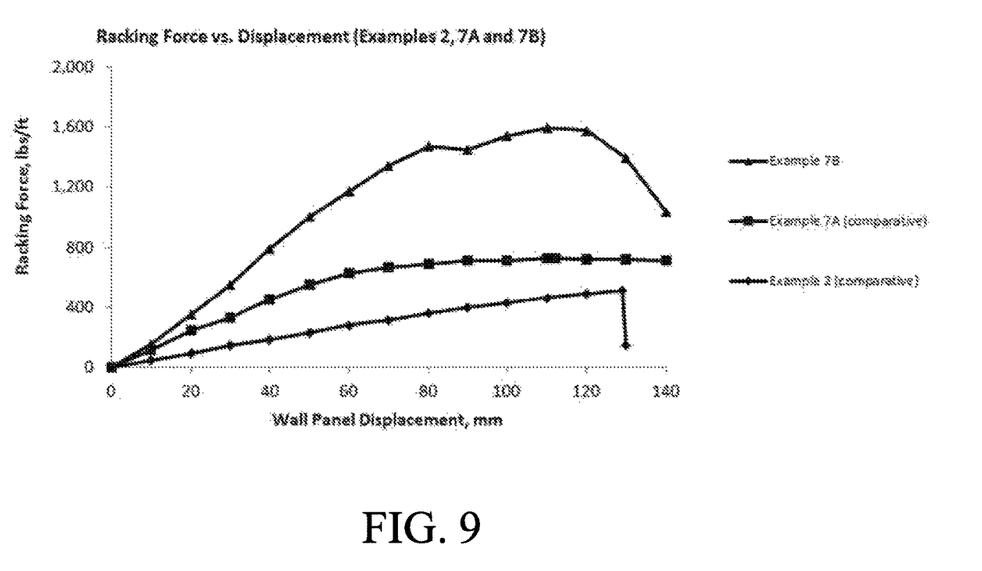

[1] 1"thick rigid insulation panel composed of a closed-celled polyisocyanurate foam core having
coated glass facers on both sides (commercially available as Hunter Panels Xci CG from Hunter
Panels, Portland, Maine)
[2] 7/16" thick OSB sheathing
[3] 20 gauge (1 mm thick) galvannealed steel sheet
[4] 24 gauge (0.7 mm thick) galvannealed steel sheet
[5] 26 gauge (0.55 mm thick) galvannealed steel sheet
[6] 28 gauge (0.48 mm thick) galvannealed steel sheet FIGS. 5-9 illustrate observed results graphically and Table 2 shows the theoretical predicted maximum racking strength for each example based on additive contribution from sheathing material and spray foam to the actual maximum racking strength observed.

TABLE 2

| Example | Maximum Racking Force, lbs/ft | % greater than theoretical |
|---|---|---|
| 2 + 3A (theoretical) | 1,544 | — |
| 3B | 1,587 | 3% |
| 2 + 4A (theoretical) | 1,735 | — |
| 4B | 1,869 | 7% |
| 2 + 5A (theoretical) | 1,351 | — |
| 5B | 1,557 | 13% |
| 2 + 6A (theoretical) | 1,179 | — |
| 6B | 1,781 | 34% |
| 2 + 7A (theoretical) | 1,246 | — |
| 7B | 1,590 | 22% |

As is apparent, employing relatively thinner sheet metal sheathing, such as 26 and 28 gauge sheet metal sheathing (Examples 6B and 7B), produced wall structures exhibiting a racking strength similar to those wall structures in which sheet metal sheathing employed was significantly thicker (Examples 4B and 5B). In addition, the observed racking strength improvement, particularly in cases where such relatively thin sheet metal sheathing was employed, far exceeded the racking strength improvement expected from simply the additive contributions of the spray foam layer and sheet metal sheathing independently, thereby indicating the presence of a significant synergistic effect resulting from the combination of sheet metal sheathing and the spray foam layer, especially in those cases where the relatively thinner sheet metal sheathing was employed.

Various features and characteristics of the inventions are described in this specification to provide an overall understanding of the disclosed wall structures and method of manufacture. It is understood that the various features and characteristics described in this specification can be combined in any suitable manner regardless of whether such features and characteristics are expressly described in combination in this specification. The Applicant expressly intends such combinations of features and characteristics to be included within the scope of this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with written description and sufficiency of description requirements (e.g., 35 U.S.C. § 112(a) and Article 123(2) EPC). The wall structures and methods disclosed in this specification can comprise, consist of, or consist essentially of the various features and characteristics described in this specification.

Also, any numerical range recited in this specification describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will not add new matter to the specification or claims, and will comply with written description and sufficiency of description requirements (e.g., 35 U.S.C. §§ 112(a) and Article 123(2) EPC). Additionally, numerical parameters described in this specification should be construed in light of the number of reported significant digits, the numerical precision of the number, and by applying ordinary rounding techniques. It is also understood that numerical parameters described in this specification will necessarily possess the inherent variability characteristic of the underlying measurement techniques used to determine the numerical value of the parameter.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the described processes, compositions, and products. Further, the use of a singular noun includes the plural, and the use of a plural noun includes the singular, unless the context of the usage requires otherwise.

What is claimed is:

1. A wall structure comprising:
   (a) a frame comprising:
      (i) a first member;
      (ii) a second member spaced apart from the first member; and
      (iii) connecting members extending between the first member and the second member,
      wherein the first member, the second member, and the connecting members each comprise a front surface and a rear surface that form a front frame surface and a rear frame surface;
   (b) an impermeable sheet metal sheathing having a thickness of 0.18 to 3.74 mm (0.007 to 0.147 inch) overlying the front frame surface such that the sheet metal sheathing, the first member, the second member, and the connecting members define a cavity;

(c) a foam panel overlying a front surface of the sheet metal sheathing; and (d) a foam layer disposed within the cavity, wherein the foam layer adheres to a rear surface of the sheet metal sheathing.

2. The wall structure of claim 1, wherein the sheet metal sheathing comprises galvanized steel or galvannealed steel.

3. The wall structure of claim 1, wherein the sheet metal sheathing has a thickness of 0.31 to 0.63 mm (0.012 to 0.025 inch).

4. The wall structure of claim 1, wherein the sheet metal sheathing has a thickness of 0.31 to 0.55 mm (0.012 to 0.022 inch).

5. The wall structure of claim 1, wherein the foam panel abuts the sheet metal sheathing.

6. The wall structure of claim 1, wherein the foam panel comprises polyisocyanurate foam.

7. The wall structure of claim 1, wherein the foam panel comprises closed-cell foam having a closed cell content of at least 80%, when measured according to ASTM D6226-(2015).

8. The wall structure of claim 1, wherein the foam panel has a thickness of 1 to 2 inches (2.54 to 5.08 cm).

9. The wall structure of claim 1, wherein the foam panel is fastened to the sheet metal sheathing with mechanical fasteners.

10. The wall structure of claim 1, wherein the foam layer has a density of at least 2.8 lb/ft$^3$ (44.9 kg/m$^3$), when measured according to ASTM D1622-(2008).

11. The wall structure of claim 1, wherein the foam layer has a thickness extending from the rear surface of the sheet metal sheathing to a position intermediate the front frame surface and the rear frame surface, thereby forming a gap within the frame between a rear surface of the foam layer and the rear frame surface.

12. The wall structure of claim 1, wherein the sheet metal sheathing abuts the front frame surface.

13. The wall structure of claim 2, wherein the sheet metal sheathing comprises galvanized steel or galvannealed steel having a thickness of 0.31 to 0.63 mm (0.012 to 0.025 inch) and the foam panel abuts the sheet metal sheathing.

14. The wall structure of claim 1, wherein the sheet metal sheathing is mechanically fastened to the front frame surface.

15. The wall structure of claim 14, wherein the foam panel is fastened to sheet metal sheathing and the front frame surface by mechanical fasteners having a length greater than mechanical fasteners used to attach the sheet metal sheathing to the front frame surface.

16. The wall structure of claim 1, wherein the foam panel comprises a facer on a rear face of a core foam layer, a front face of a core foam layer, or on a rear face and a front face of a core foam layer.

17. The wall structure of claim 16, wherein the facer comprises a glass mat filled with recycled cardpanel and colored with carbon black, a fiberglass mat, a glass fiber-reinforced cellulosic felt, a coated and polymer-bonded fiber mat, a foil, a coated foil, a foil and membrane laminate, a foil and glass composite, or a polyolefin film.

18. A method of manufacturing the wall structure of claim 1 comprising depositing a foam-forming material into a cavity of the wall structure so that the foam-forming material forms a foam layer that adheres to a rear surface of a sheet metal sheathing that has a thickness of 0.18 to 3.74 mm (0.007 to 0.147 inch), wherein the sheet metal sheathing overlies a front surface of a frame of the wall structure, the frame being formed by a front surface of a first member, a front surface of a second member that is spaced apart from the first member, and a front surface of connecting members extending between the first member and the second member and the sheet metal sheathing is fastened to the front frame surface such that the sheet metal sheathing, the first member, the second member, and the connecting members define a cavity; and wherein a foam panel overlies the sheet metal sheathing.

19. A building comprising:
(1) a first wall structure comprising:
 (a) a frame comprising:
  (i) a first member;
  (ii) a second member spaced apart from the first member; and
  (iii) connecting members extending between the first member and the second member, wherein the first member, the second member, and the connecting members each comprise a front surface and a rear surface that form a front frame surface and a rear frame surface;
 (b) an impermeable sheet metal sheathing having a thickness of 0.18 to 3.74 mm (0.007 to 0.147 inch) overlying the front frame surface such that the sheet metal sheathing, the first member, the second member, and the connecting members define a cavity;
 (c) a foam panel overlying a front surface of the sheet metal sheathing; and
 (d) a foam layer disposed within the cavity, wherein the foam layer adheres to a rear surface of the sheet metal sheathing; and
(2) a second wall structure disposed adjacent to the first wall structure, wherein (i) the second wall structure does not include a sheet metal sheathing overlying a front frame surface thereof, and (ii) a thickness of the first wall structure is substantially the same as a thickness of the second wall structure.

20. The building of claim 19, wherein the second wall structure comprises:
(a) a frame comprising:
 (i) a first member;
 (ii) a second member spaced apart from the first member; and
 (iii) connecting members extending between the first member and the second member, wherein the first member, the second member, and the connecting members each comprise a front surface and a rear surface that form the front frame surface and a rear frame surface;
(b) a foam panel fastened to at least a portion of the front frame surface, wherein the foam panel, the first member, the second member, and the connecting members define a cavity; and
(c) a foam layer disposed within the cavity, wherein the foam layer adheres to the foam panel.

* * * * *